US009818135B2

United States Patent
Biesecker et al.

(10) Patent No.: US 9,818,135 B2
(45) Date of Patent: Nov. 14, 2017

(54) SOCIAL GRAPHS USING SHARED PERSONAL DATA

(71) Applicant: HomeAway.com, Inc., Austin, TX (US)

(72) Inventors: Blake Biesecker, Portland, OR (US); Kerry Kelley, Portland, OR (US)

(73) Assignee: HomeAway.com, Inc., Austin, TX (US)

( * ) Notice: Subject to any disclaimer, the term of this patent is extended or adjusted under 35 U.S.C. 154(b) by 0 days.

(21) Appl. No.: 15/050,384

(22) Filed: Feb. 22, 2016

(65) Prior Publication Data

US 2016/0307234 A1   Oct. 20, 2016

Related U.S. Application Data

(63) Continuation of application No. 13/230,752, filed on Sep. 12, 2011, now Pat. No. 9,269,100.

(Continued)

(51) Int. Cl.
G06Q 30/02     (2012.01)
H04L 29/08     (2006.01)
(Continued)

(52) U.S. Cl.
CPC ... *G06Q 30/0269* (2013.01); *G06F 17/30345* (2013.01); *G06F 17/30958* (2013.01); *G06Q 10/101* (2013.01); *G06Q 30/0251* (2013.01); *G06Q 30/0271* (2013.01); *G06Q 30/0277* (2013.01); *G06Q 50/01* (2013.01); *H04L 43/045* (2013.01); *H04L 63/104* (2013.01);
(Continued)

(58) Field of Classification Search
CPC .............. G06Q 30/0251; G06Q 30/0277; H04L 51/32; H04L 67/306; H04L 12/588
See application file for complete search history.

(56) References Cited

U.S. PATENT DOCUMENTS 7,761,342 B2   7/2010   Calabria
2005/0216300 A1   9/2005   Appelman et al.
(Continued)

FOREIGN PATENT DOCUMENTS

WO   WO 2013/023222   2/2013
WO   WO 2013/023223   2/2013

OTHER PUBLICATIONS

Copenheaver, Blaine R., International Searching Authority, Notification of Transmittal of the International Search Report and the Written Opinion of the International Searching Authority, or the Declaration, dated Oct. 18, 2012 for International Patent Application No. PCT/US2012/050645.

(Continued)

*Primary Examiner* — John Breene
*Assistant Examiner* — Eyob Hagos
(74) *Attorney, Agent, or Firm* — Knobbe Martens Olson & Bear LLP (57) ABSTRACT

Social graphs using shared personal data are described, including techniques for capturing data from a social data source, determining one or more connections associated with an item using the data, and creating a social graph using the one or more connections, the social graph comprising the one or more connections associated with the item. Embodiments of the invention also include techniques for updating social graphs.

13 Claims, 6 Drawing Sheets

Related U.S. Application Data (60) Provisional application No. 61/522,667, filed on Aug. 11, 2011.

(51) Int. Cl.

| | | |
|---|---|---|
| *G06Q 10/10* | (2012.01) | |
| *G06Q 50/00* | (2012.01) | |
| *H04L 12/26* | (2006.01) | |
| *G06F 17/30* | (2006.01) | |
| *H04L 29/06* | (2006.01) | |
| *H04L 12/58* | (2006.01) | |

(52) U.S. Cl.
CPC ............ *H04L 67/22* (2013.01); *H04L 67/306* (2013.01); *H04L 51/32* (2013.01)

(56) References Cited

U.S. PATENT DOCUMENTS

| | | |
|---|---|---|
| 2007/0219712 A1 | 9/2007 | Abhyanker |
| 2007/0260576 A1 | 11/2007 | Elliot et al. |
| 2008/0004941 A1 | 1/2008 | Calabria |
| 2008/0275861 A1 | 11/2008 | Baluja et al. |
| 2009/0063630 A1* | 3/2009 | Obasanjo ................ H04L 67/22 709/204 |
| 2009/0132652 A1 | 5/2009 | Athale et al. |
| 2009/0171686 A1 | 7/2009 | Eberstadt |
| 2009/0299824 A1 | 12/2009 | Barnes |
| 2010/0082446 A1 | 4/2010 | Hjelm et al. |
| 2010/0125605 A1 | 5/2010 | Nair et al. |
| 2010/0169364 A1 | 7/2010 | Hardt |
| 2010/0235848 A1 | 9/2010 | Lam et al. |
| 2011/0035329 A1 | 2/2011 | Delli Santi et al. |
| 2011/0047012 A1* | 2/2011 | Sherman ................ G06Q 10/10 705/14.1 |
| 2012/0179516 A1* | 7/2012 | Fakhrai ................... G06Q 30/08 705/14.1 |
| 2012/0316948 A1* | 12/2012 | Shipley ................... G06Q 30/02 705/14.23 |
| 2013/0041916 A1 | 2/2013 | Biesecker et al. |
| 2013/0132133 A1* | 5/2013 | Ngongang ............. G06Q 50/14 705/5 |
| 2013/0173457 A1 | 7/2013 | Chrapko |
| 2013/0331179 A1 | 12/2013 | Taylor et al. |

OTHER PUBLICATIONS

Google Scholar search, "weighting |ranking| |recommending| |review| |suggesting| purchase product |item| in social network" Nov. 12, 2015.

Google Scholar search, "prioritize a display based on relationship proximity in social network" Nov. 12, 2015.

Google Scholar search, "Biesecker and weighting factor prioritize display in social network" Nov. 12, 2015.

Kim, Paul, U.S. Office Action dated Aug. 28, 2012 for U.S. Appl. No. 13/230,759.

Kim, Paul, U.S. Office Action dated Feb. 13, 2013 for U.S. Appl. No. 13/230,759.

Kim, Paul, U.S. Office Action dated Apr. 21, 2014 for U.S. Appl. No. 13/230,759.

Kim, Paul, U.S. Office Action dated Nov. 17, 2015 for U.S. Appl. No. 13/230,759.

Young, Lee W., International Searching Authority, Notification of Transmittal of the International Search Report and the Written Opinion of the International Searching Authority, or the Declaration, dated Oct. 23, 2012 for International Patent Application No. PCT/US2012/050651.

\* cited by examiner

| | Connection Type (302) | Property (304) | Connection Source (306) | Connector (308) | Friend Connectee (310) | FoF Connector (312) |
|---|---|---|---|---|---|---|
| 314 | Owns | Prop_id: 1 | Property: 1 | User: Sam | User: Sam | None |
| 316 | Friend Owns | Prop_id: 1 | Property: 1 | User: Sam | User: Sally | None |
| 318 | FoF Owns | Prop_id: 1 | Property: 1 | User: Sam | User: Fred | User: Sally |
| 320 | Reviewed | Prop_id: 1 | Review: 1 | User: John | User: John | None |
| 322 | Friend Reviewed | Prop_id: 1 | Review: 1 | User: John | User: Jill | None |
| 324 | FoF Reviewed | Prop_id: 1 | Review: 1 | User: John | User: Jack | User: Jill |
| 326 | Stayed | Prop_id: 1 | Property: 1 | User: Bill | User: Bill | None |
| 328 | Friend Stayed | Prop_id: 1 | Property: 1 | User: Bill | User: Jack | None |

SOCIAL GRAPHS USING SHARED PERSONAL DATA

CROSS-REFERENCE TO RELATED APPLICATIONS

This application is a continuation of U.S. Nonprovisional patent application Ser. No. 13/230,752, filed Sep. 12, 2011, and entitled "Social Graphs Using Shared Personal Data", application Ser. No. 13/230,752 claims the benefit of U.S. Provisional Patent Application No. 61/522,667, filed Aug. 11, 2011, and entitled "Social Graphs Using Shared Personal Data," all of which is herein incorporated by reference in their entirety for all purposes.

FIELD

The present invention relates generally to software and electronic commerce. More specifically, techniques associated with social graphs using shared personal data are described.

BACKGROUND

Consumers consult many sources of information when searching for items of interest to rent or buy, including the vast Internet. However, the majority of consumers still trust recommendations from people they know and opinions (e.g., reviews, ratings, comments, etc.) by others with common attributes (e.g., place of residence, place of vacation, group affiliations, hobbies, etc.) over all other types of information to help them make decisions with regard to high risk transactions (e.g., involving large dollar amounts). A person's social networks (e.g., networks maintained on social or professional networking websites) can be used to rapidly grow both demand and supply for the rental or sale of an item, particularly a high-priced item, by reducing the fear and hassle of dealing with strangers.

Conventional electronic commerce techniques for marketing and promotion of items for rent or sale typically include a listing of the item, e.g., on a marketing or promotion website, with information about the item. Such information may include features and photos of the item. For instance, a vacation rental listing may include information about the vacation rental property's size (e.g., bedrooms, bathrooms, square footage, etc.) and location (e.g., street address, nearby landmarks, etc.). The listing may include photos of the property, inside and out. The listing may even include reviews of the property by past guests. However, these conventional techniques for marketing and promotion of items for rent or sale do not provide a direct and organized method for a user to find information about the items that are owned by, used by, rented by, reviewed by, or otherwise connected to, people in their social networks. While reviews from strangers may be helpful, they are not nearly as helpful as reviews from people users know (e.g., family members, friends, co-workers, acquaintances, etc.). These conventional techniques fail to leverage the power of a consumer's social networks, particularly social networks created and maintained on social or professional networking services and websites (hereinafter "SNS"), to more effectively market items for rent or sale.

On the other hand, SNS, including Facebook®, Twitter®, Google+®, LinkedIn®, and others, provide a venue for users to maintain their social networks and share information about items they've purchased or rented, and even post reviews. However, these services are geared primarily toward the creation and maintenance of social networks, and are not designed to provide users with the capability to search for and find trusted and vetted listings of items for sale or rent. For instance, when an SNS user posts a status update, link, picture, or tweet, indicating a purchase or rental (e.g., vacation rental), even including a review or comment about the item purchased or rented, that status update, link, picture or tweet is virtually lost as time passes and new status updates, links, pictures and tweets are posted. Later on, when another user that is in their network begins searching for a similar item to purchase or rent, it is difficult, if not impossible, to directly reference the prior post. As such, SNS do not offer owners and sellers the ability to create a standing and readily searchable referral network for items for rent or sale based upon personal data shared through SNS, nor do they provide renters and buyers a time independent method for searching for items to buy or rent using their trusted personal connections.

Thus, what is needed is a technique for marketing of items for rent or sale without the limitations of conventional techniques.

BRIEF DESCRIPTION OF THE DRAWINGS

Various embodiments of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including Java™, Javascript™, Ruby, Rails, C, Objective C, C++, C#, Adobe® Integrated Runtime™ (Adobe® AIR™) ActionScript™, Flex™, Lingo™, Ajax, Perl, COBOL, Fortran, ADA, XML, MXML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

Figure 1:
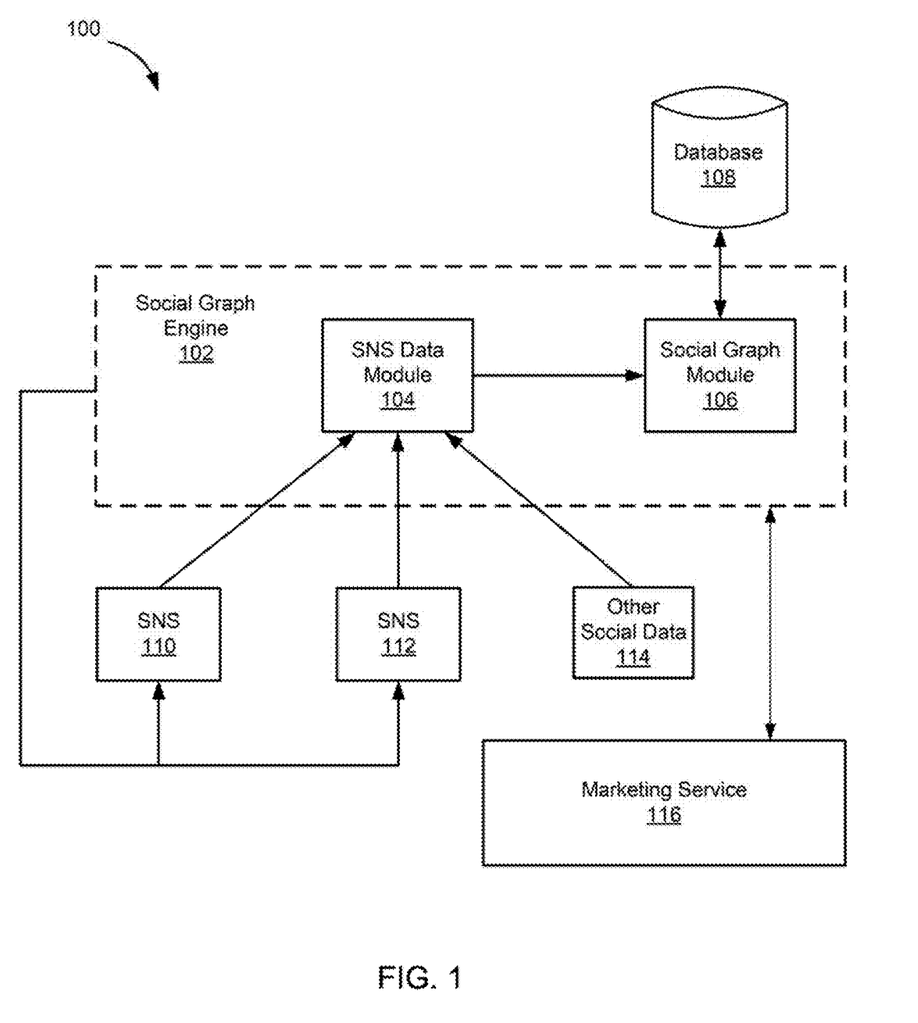
FIG. 1 illustrates an exemplary system for creating, storing and using social graphs for marketing items for sale or rent.

FIG. 1 illustrates an exemplary system for creating, storing and using social graphs for marketing items for sale or rent. System 100 may include social graph engine 102, SNS data module 104, social graph module 106, database 108, SNS 110-112, other social data 114, and marketing service 116. Each of SNS 110-112 may be a social or professional networking service (hereinafter "SNS") (e.g., Facebook®, Twitter®, Google+®, LinkedIn®, etc.). Other social data 114 may include other sources of social marketing or shared personal data, e.g., provided by marketing data services, that may be linked to a personally identifiable information (e.g., name, electronic mail address (hereinafter "e-mail address"), telephone number, drivers license number, other identification number, etc.).

In some examples, social graph engine 102 may be configured to receive an inquiry relating to an item for sale or for rent from a source. For example, the source may be a user of (e.g., a visitor to, a member of, etc.) marketing service 116. The inquiry may include access information (e.g., login associated with an SNS, and in some cases, an option to allow access to personal or social data maintained with the SNS) providing social graph engine 102 access to social data associated with the source of the inquiry. Using the access information, SNS data module 104 may gather social data from SNS 110-112, or from other social data 114. In other examples, SNS data module 104 may gather social data from more or fewer SNS. In still other examples social graph engine 102 may obtain social data through other means (not shown), e.g., manual data input, by tracking a source's browsing behavior, etc. In some examples, this social data may include a list identifying friends of the source, groups to which the source belongs, the source's hometown, the source's current location, the source's educational institution affiliations, the source's work affiliations, and the source's other affiliations. In other examples, the social data may include other information.

In some examples, social graph module 106 may be configured to use the social data gathered by SNS data module 104 to create or update (i.e., include in or add to) a social graph associated with an item for sale or rent. As used herein, a "social graph" refers to a network of connections (e.g., owner(s), buyers, renters (i.e., guests), service providers (e.g., architects, designers, builders, structural engineers, electricians, plumbers, gardeners, handymen, etc.), friends of an owner, friends of a buyer, friends of a renter, friends of friends, etc.) associated with, or attached to, an item. These connections comprise one or more relationships associating a person with the item. For example, a social graph associated with a property for rent may include identifications of such connections as the property owner, past guests, reviewers, service providers, friends of the owner, friends of past guests, friends of friends, etc. By mapping the source's social data, which may include their connections to other people among other shared personal information, to connections associated with an item for sale or rent, the item may be marketed using a trusted and vetted item listing showing how other users known to the source are connected to the item, and hence how the source is connected to the item.

Social graph module 106 may use additional information from different inputs to create or update social graphs. In some examples, information may be entered by the source, or by other users, using forms, fields, menus, widgets, or other input methods on a website. For example, a user may create a listing for an item by identifying the item and adding information about the item, including the user's connection to the item. This listing information may be used by social graph module 106 to create a social graph for the item. The user may invite other users to indicate their connection to the item, and when the other users indicate their connection to the item, social graph module 106 may use that input to update the social graph for the item.

For example, an owner of a vacation rental property may create a listing for the property and indicate her ownership relationship with the property. The owner may input this information through marketing service 116, or through another online listing service for marketing and searching for vacation rental properties (not shown). The owner may input or upload information about the property for rent, including an identification of the property (e.g., address, type (e.g., house, condominium, hotel room, etc.), etc.), a description of the property (e.g., number of bedrooms or bathrooms, number of stories, amenities, accessibility, surrounding features (e.g., beach, lake or river, neighborhood, restaurant/shopping districts, etc.), etc.), pictures of the property, and other information related to the property. In some examples, marketing service 116 may request that the owner create or use a login prior to using the service. Social graph module 106 may use the information related to the property to create a social graph for the property. This social graph may be stored in database 108.

In some examples, social graph module 106 may subsequently update the social graph for the property with additional information and connections entered later by the owner or other users. For example, the owner may have friends that are already users (e.g., members) of marketing service 116, as well as friends that are not members. Marketing service 116 may provide tools for the owner to invite past guests, service providers, friends and other people in her social or professional networks to use marketing service 116 and to indicate their connections to the property. These tools may enable the owner to enter contact information (e.g., e-mail addresses, telephone numbers, etc.) for these people, to which marketing service 116 may then send invitations to visit marketing service 116 and to indicate their connection to the property and/or to the owner. These tools may further enable the owner to track whether the invitations are accepted or not.

In some examples, the invitation may include a link for the recipient to navigate to marketing service 116. In some examples, marketing service 116 may request that the recipient create or use a login prior to using the service. Once logged in, marketing service 116 may connect the recipient to the property by providing the recipient identification and connection information to social graph engine 102. Marketing service 116 also may collect a rating, review, comment, or other input about the property from the recipient. This additional input may be used by social graph module 106 to update the social graph further. In some examples, this additional input may be provided to the owner. In other examples, the owner may designate an administrator, co-owner or property manager, to monitor and update the listing on marketing service 116. The information provided by the administrator also may be used to update the social graph for the listing.

The social graphs created or updated by social graph module 106 may be stored in database 108. Database 108 may be managed by a database management system (DBMS) (e.g., MySQL®, SQL Server®, Oracle®, etc.). Exemplary representations of, and exemplary schemas for organizing and storing, social graphs are described in more detail below.

In some examples, social graph engine 102 may be configured to provide feedback messages or notifications authorized by, and associated with, the source to SNS 110-112. In an example, social graph engine 102 may output notifications or messages related to the source's connection to an item for which social graphs exist in database 108. The notifications or messages may include photos or pictures of the item, a link to a listing or review (i.e., the source's review) of the item, a personal message from the source associated with the item, or other information associated with the item or the source's connection to the item. The notifications or messages also may be associated with actions by the source associated with the item (e.g., recommending the item, indicating the source likes the item, indicating the source is a fan of the item, commenting on the item, reviewing the item, etc.). For instance, the source may be connected as a friend of an owner of a vacation rental property. A notification or message about this connection may be posted to SNS 110-112 available for the source's friends, acquaintances, professional network, etc., to view (e.g., posted to a Facebook® wall, as a tweet on Twitter®, as LinkedIn® status update, etc.).

In some examples, SNS data module 104 and social graph module 106 may be implemented as part of social graph engine 102. In other examples, one or the other of SNS data module 104 and social graph module 106 may be implemented separately. Database 108 may be implemented separately from social graph engine 102, as shown, or it may be implemented as part of social graph engine 102 (not shown). Different functions and operations beyond those described herein may be performed using system 100. The number, type, function, configuration, or features of system 100 and the above-described elements may be varied and are not limited to the examples provided.

Figure 2:
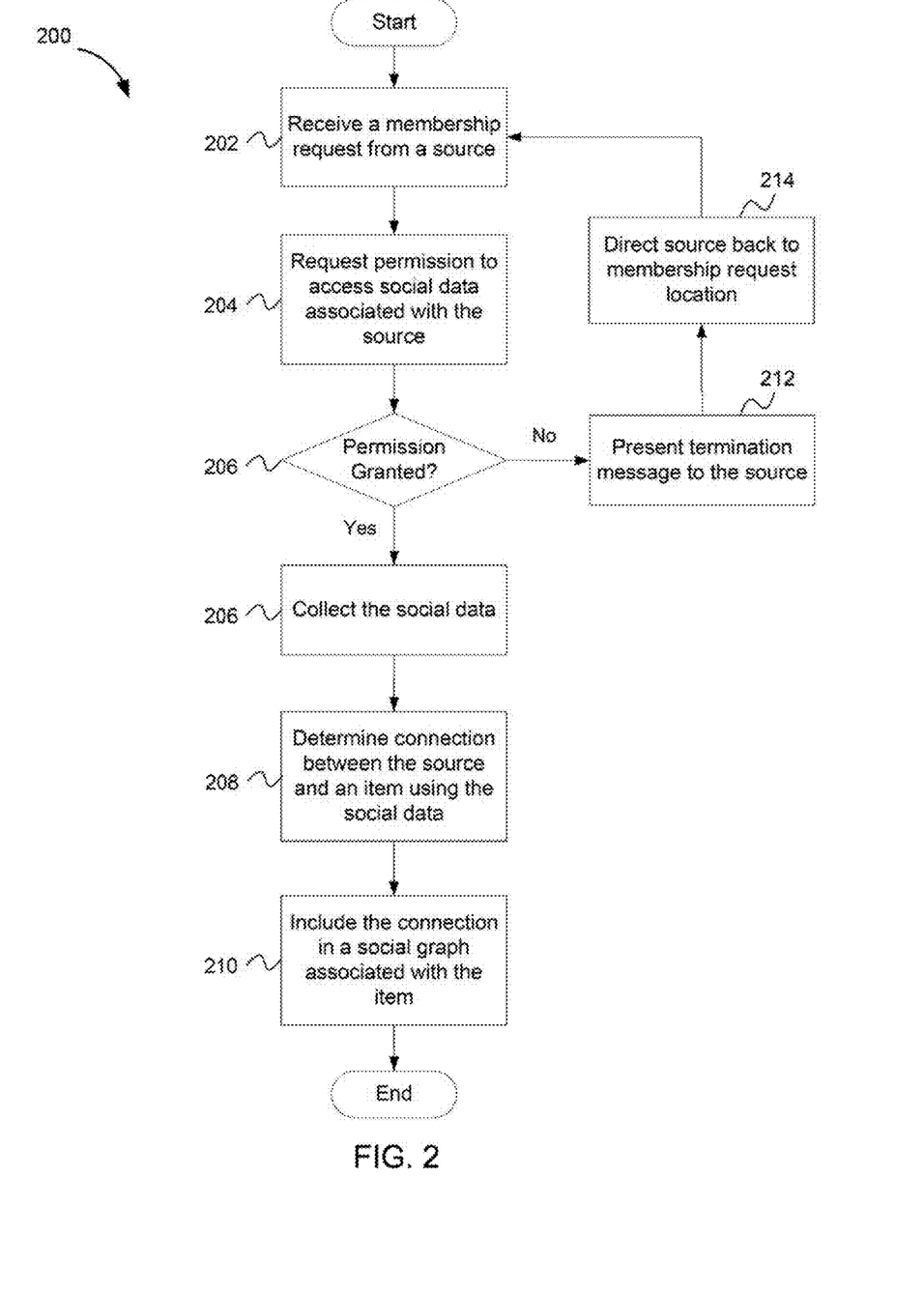
FIG. 2 illustrates an exemplary process for including connection information in a social graph associated with an item for sale or rent.

FIG. 2 illustrates an exemplary process for including connection information in a social graph associated with an item for rent or sale. Process 200 may be implemented as an exemplary process for creating or updating a social graph associated with an item for rent or sale (e.g., as listed on marketing service 116) using a new member's social data. In some examples, process 200 may begin with receiving a membership request from a source. In some examples, the source may be a user of marketing service 116 that has not yet set up a login (e.g., a username and password, or selected an option to sign up using a login corresponding to an SNS to which the user is already a member (e.g., using the user's Facebook® login), etc.) or provided permission to access their social data, for example, as maintained on their SNS account or a marketing data service. In some examples, the membership request may be made through a marketing service website, for example marketing service 116, for the types of items for rent or sale of interest to the source. For example, the source may be interested in searching for vacation rental properties, and marketing service 116 may be a vacation rental listing website. In order to access the services of marketing service 116, the source may visit the website and set up a login to request membership access to those services. After the membership request is received, a request may be made for permission from the source to access social data associated with the source (204). The social data being requested may be maintained by an SNS (e.g., Facebook®, Twitter®, Google+®, LinkedIn®, etc.) in the source's already existing account with the SNS. When permission to access the source's social data is granted, the social data is collected (206), for example by SNS data module 104, described above. Then, using the social data, connections between the source an item for rent or sale (e.g., offered on marketing service 116) may be determined (208), for example by social graph module 106. For example, the social data may indicate that the source is a friend of another member of marketing service 116, and that other member has a connection (e.g., an ownership relationship, a past guest relationship, a service provider relationship, a reviewer relationship, a recommender relationship, etc.) with an item for rent or sale. The source is then connected to the item through the other member through a friend relationship (e.g., as a friend of the owner, a friend of the past guest, a friend of the service provider, a friend of the reviewer, a friend of the recommender, etc.). This connection may then be included in a social graph associated with the item (210).

In some examples, if the source does not grant permission, a termination message is presented (212). For example, the termination message may indicate that such permission is necessary to proceed. In this example, the source may be directed back to the membership request location (e.g., webpage, portal, etc.) (214). In other examples, the termination message may indicate a different message, and the source may be directed to a different location.

Figure 3:
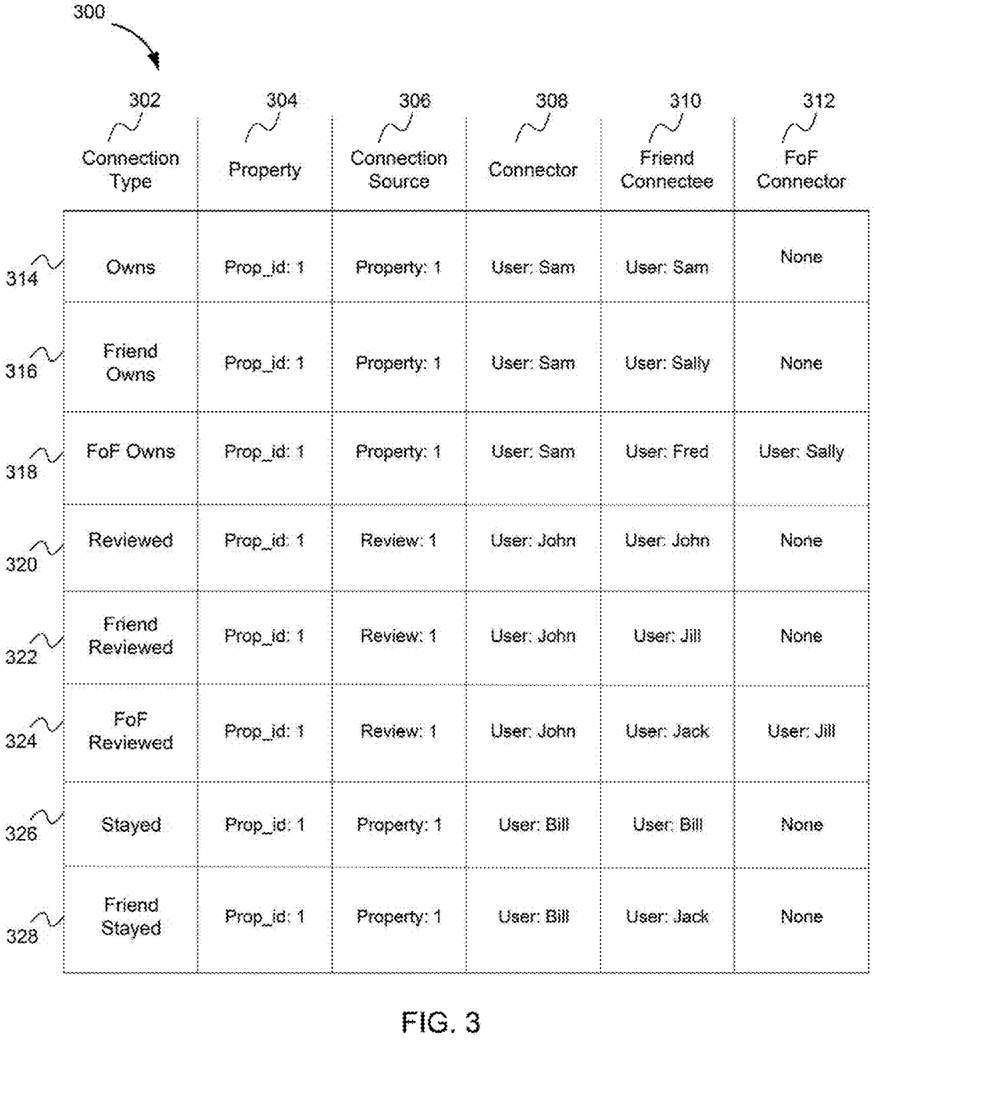
FIG. 3 illustrates an exemplary table for storing connection information in a social graph associated with an item for rent or sale.

FIG. 3 illustrates an exemplary table for organizing connection information in a social graph associated with an item for rent or sale. As shown, table 300 may include the columns Connection Type 302, Property 304, Connection source 306, Connector 308, Friend Connectee 310, and Friend-of-Friend ("FoF") Connector 312, as well as rows 314-328. Connection type 302 may include the values Owns, Friend Owns, FoF Owns, Reviewed, Friend Reviewed, FoF Reviewed, Stayed and Friend Stayed. Property 304 may include Prop_id: 1, corresponding to the item for rent or sale. Connection source 306 may include Property: 1 and Review: 1, corresponding to the sources of the connection (e.g., a property listing, a review, etc.). Connector 308, friend connectee 310 and FoF connector 312 may include User values (e.g., User: Sam, User: Sally, User: Fred, User: John, User: Jill, User: Jack, User: Bill, etc.), corresponding to members, or a null value (e.g., None). The rows each represent a connection. For example, Row 314 comprises the connection type Owns, the property Prop_id: 1, the connection source Property: 1, the connector User: Sam, friend connectee User: Sam, and no FoF connector. In this example, Row 314 may represent, for the property corresponding to Prop_id: 1, that the user Sam is the owner. Row 316 may represent, for the same property, that the user Sally is a friend of Sam, the owner. Row 318 may represent, for the same property, that user Fred is a friend of Sally, who in turn is a friend of Sam, the owner, and thus Fred is a FoF of the owner. Row 320 may represent, for the same property, that there is a review by user John. Row 322 may represent, for the same property, that Jill is a friend of John, the reviewer. Row 324 may represent, for the same property, that user Jack is a friend of Jill, who in turn is a friend of John, the reviewer, and thus Jack is a FoF of the reviewer. Row 326 may represent, for the same property, that user Bill is a past guest. Row 328 may represent, for the same property, that user Jack is a friend of Bill, the past guest. In other examples, table 300 may be implemented such that a null value may exist in the column friend connectee 310 where the connector has a direct relationship with the property. In still other examples, table 300 may include additional, fewer or different rows indicating additional connections.

Figure 4:
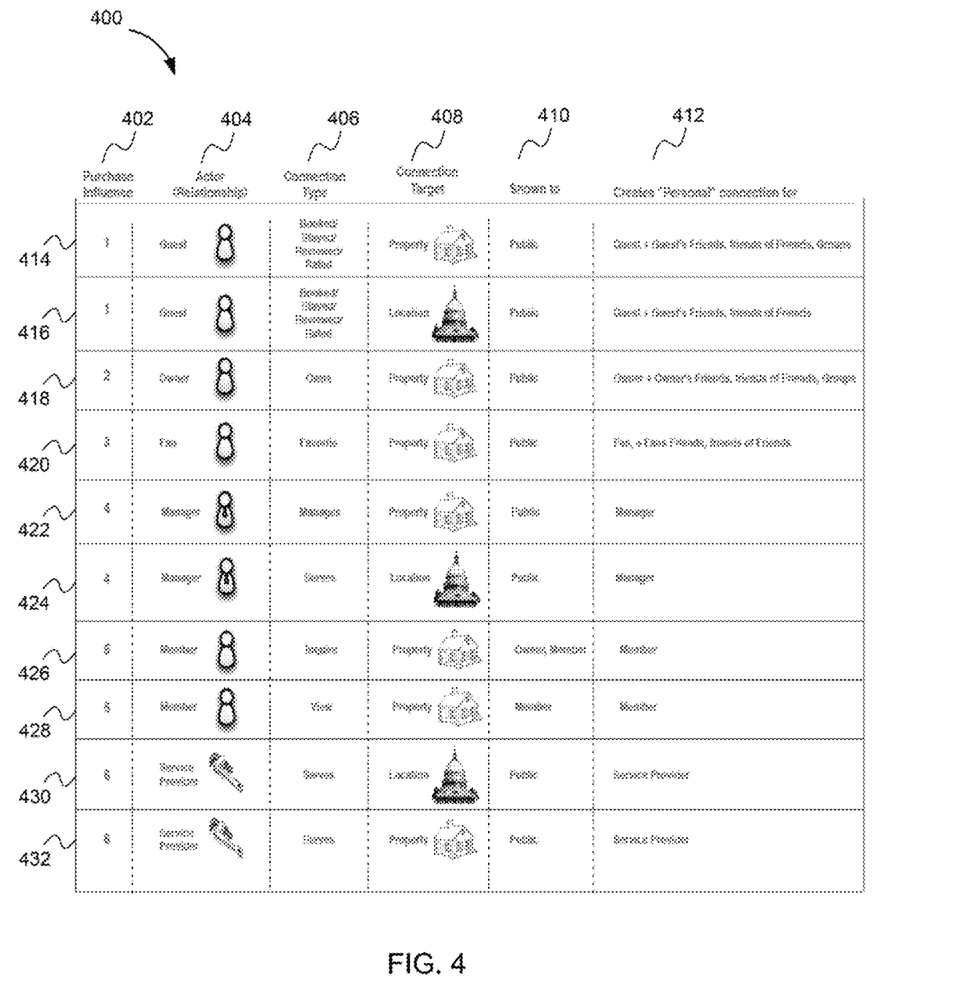
FIG. 4 illustrates an alternative exemplary table for storing connection information in a social graph associated with an item for rent or sale.

FIG. 4 illustrates an alternative exemplary table for storing connection information in a social graph associated with an item for sale or rent. As shown, table 400 may include the columns Purchase Influence 402, Actor (Relationship) 404, Connection Type 406, Connection Target 408, Shown to 410, Creates "Personal" connection for 412, as well as rows 414-432. In some examples, Purchase Influence 402 may include a numerical value (e.g., numerical values 1-6) corresponding to a weight associated with the likelihood of the connection, or type of connection, will influence a subsequent purchase or rental of the item for rent or sale. In some examples, this weighting may reflect a relationship proximity to the connection target (e.g., a property). In some examples, Actor (Relationship) 404 may include values (e.g., guest, owner, fan, manager, member, service provider, etc.) corresponding to how a user has a relationship, or otherwise interacted, with a Connection Target 408. In some examples, Connection Type 406 may include values (e.g., booked, stayed, reviewed, rated, owns, favorite, manages, serves, inquire, view, etc.) corresponding to the type of connection that the actor in that row may have with the connection target in that row. In some examples, Connection Target 408 may include values corresponding to an item of interest (e.g., a property), or group of items of interest (e.g., a location). In some examples, Shown to 410 may include values (e.g., public, owner, member, etc.) corresponding to the sphere of disclosure (e.g., to the public, to only the owner and the member, or to only the member, for example, through marketing service 116) associated with the connection(s) represented in the row. In some examples, Creates "Personal" connection for 412 may include values (e.g., Guest, Guest's Friends, friends of Friends, Groups, etc.) corresponding to the other users for which the connection(s) represented in the row may create a personal connection.

For example, as represented in row 414, a guest that has booked, stayed, reviewed and/or rated a property may have a very strong purchase influence (e.g., value of 1). That guest's connection to the property may be shown to the public, and may create personal connections for the guest, the guest's friends, the guest's FoF, or the guest's groups (e.g., clubs, educational institutions, hobby groups, etc., to which the guest is affiliated). In another example, as represented in row 416, a guest that has booked, stayed, reviewed and/or rated one or more properties in a location may have a very strong purchase influence (e.g., value of 1). The guest's connection to the location may be shown to the public, and may create personal connections for the guest, her friends and her FoF. In another example, as represented in row 418, an owner that owns a property may have a fairly strong purchase influence (e.g., value of 2). The owner's connection to the property may be shown to the public, and may create personal connections for the owner, the owner's friends, the owner's FoF, and the owner's groups. In another example, as represented in row 420, a fan that has indicated a property as her favorite may have an above average purchase influence (e.g., value of 3). The fan's connection to the property may be shown to the public, and may create personal connections for the fan, the fan's friends, and the fan's FoF. In another example, as represented in row 422, a manager that manages a property may have a relatively average purchase influence (e.g., value of 4). The manager's connection to the property may be shown to the public, and may create a personal connection for the manager. In another example, as represented in row 424, a manager that manages one or more properties in a location may have a relatively average purchase influence (e.g., value of 4). The manager's connection to the location may be shown to the public, and may create a personal connection for the manager. In another example, as represented in row 426, a member that inquires about a property may have a below average purchase influence (e.g., value of 5). The member's inquiry regarding the property may be shown to the owner and the member, and may create a personal connection for the member. In another example, as represented in row 428, a member that views a property may have a below average purchase influence (e.g. value of 5). The member's viewing of the property may be shown to only the member, and may create a personal connection for the member. In another example, as represented by row 430, a service provider that serves one or more properties in a location may have a low purchase influence (e.g., value of 6). The service provider's connection to the location may be shown to the public, and may create a personal connection for the service provider, or other service providers. In another example, as represented by row 432, a service provider that serves a property may have a low purchase influence (e.g., value of 6). The service provider's connection to the property may be shown to the public, and may create a personal connection for the service provider, or other service providers. In other examples, the guest, owner, fan, manager, member, or service provider, may create personal connections for other users in their network not shown in table 400. For example, a manager's connection to a property or a location may create personal connections for the manager's friends or FoF. In other examples, a service provider's connection to a property or a location may create personal connections for the service provider's friends or FoF. In still other examples, table 400 may include additional, fewer or different rows and columns.

The above-described tables show examples of how data associated with user's connections with properties may be stored and organized. In still other examples, tables may be created to store and organize other data associated with social graphs. For example, a table may store data associated with a member's total friends, including friends that are members and friends that are not members. In another example, a table may store data associated with how members are related to other members, including whether they are friends (e.g., Facebook® friends, etc.) or FoFs (e.g., connected through a mutual friend). In another example, a table may store data associated with the relationship and associated privileges that an owner, administrator, co-owner, or property manager, may have for a property.

Figure 5:
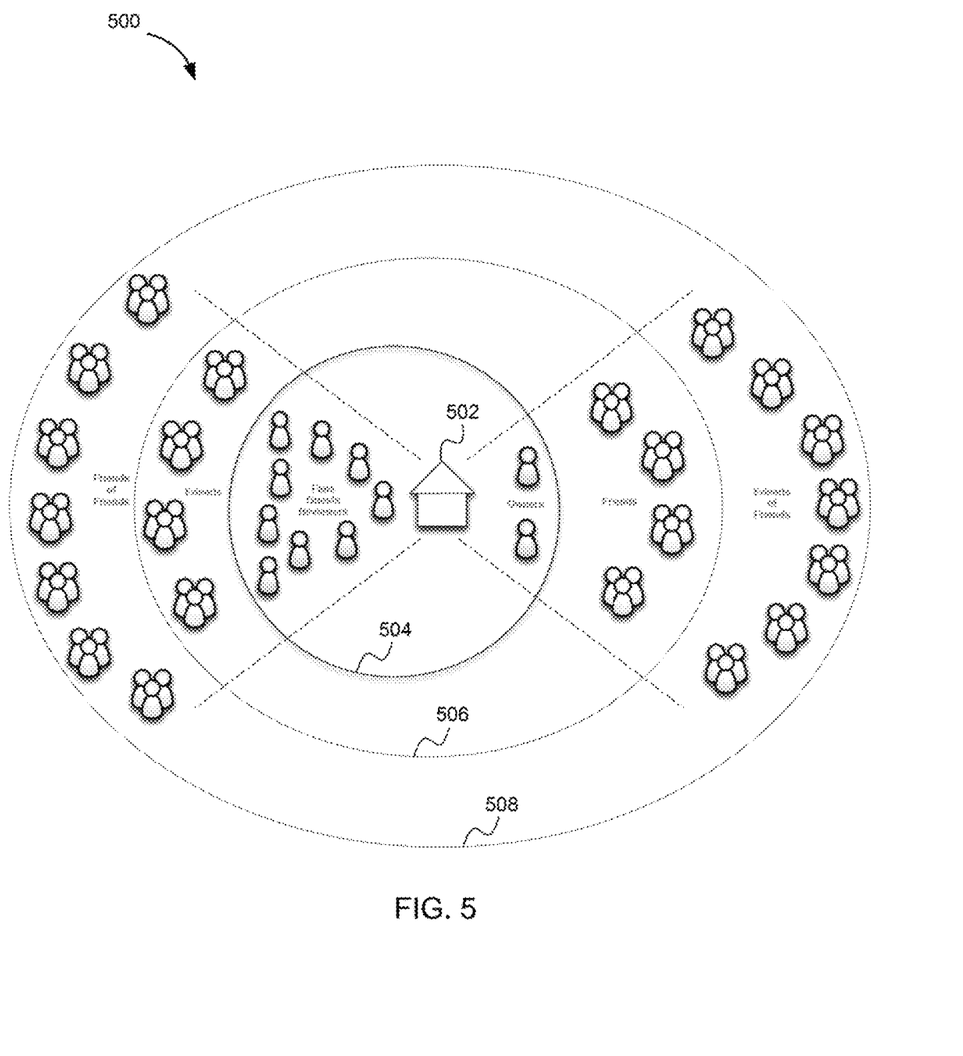
FIG. 5 illustrates an exemplary representation of a social graph for an item for rent or sale.

FIG. 5 illustrates an exemplary representation of a social graph for an item for rent or sale. Social graph 500 may include item 502, inner group 504, middle group 506 and outer group 508. In some examples, item 502 may be an item of interest to a potential renter or buyer. For example, item 502 may be a vacation rental property. In some examples, inner group 502 may represent or include the closest, and thus most powerful, connections to item 502. These connections may exert the most purchase influence on the users. For example, inner group 502 may include owners, fans, guests and reviewers. In some examples, middle group 506 may represent or include the next closest, and still powerful, connections to item 502. These connections may exert an average or medium purchase influence on the users. For example, middle group 506 may include users with friend relationships with item 502 (e.g., friend of owner, friend of guest, friend of reviewer, friend of fan). In some examples, outer group 508 may represent or include more tenuous, but existing, connections to item 502. These connections still may exert some purchase influence on the users.

In some examples, inner group 502, middle group 506, and outer group 508, each may represent a relationship proximity to item 502. This relationship proximity may be used to assign a weight to the connections in each group. The weight may be used to prioritize displays of the connections, for example, through marketing service 116. In other examples, relationship proximity may be defined differently, and thus weights assigned to connections differently (not shown). For example, a first group with the closest relationship proximity to item 502 may include a member that owns, manages or listed item 502, a member that rated item 502, a member that is a past guest of item 502, a member that left a comment about item 502, and a member that indicated a liking for (i.e., "liked") item 502. In this example, a second group with the next closest relationship proximity to item 502 may include a friend of a past guest of item 502, a friend of a member that rated item 502, a friend of a member that left a comment about item 502, and a friend of a member that liked item 502. In this example, a third group with the third closest relationship proximity to item 502 may include a friend of an owner of item 502, a friend of a manager of item 502, and a friend of an owner of item 502. In this example, a fourth group with the fourth closest relationship proximity to item 502 may include a FoF of a past guest of item 502, a FoF of a member that rated item 502, and a FoF of a member that left a comment about item 502. The first group has the greatest weight, thus the connections therein may be prioritized first when being displayed for other members viewing item 502 or browsing the location of item 502, for example, through marketing service 116. The second group has the second greatest weight, and thus the connections in the second group may have secondary priority when being displayed for other members, and so on with the remaining groups. Any of the above-described groupings, or any other type of groupings based upon connections in a social graph, may be used in promotions associated with an item (e.g., item 502). For example, an owner, co-owner, or property manager, may offer a certain discount to all members in a group for renting item 502. In another example, an owner, co-owner, or property manager, may offer a different or additional discount to all members in a group that refer their friends. Many different types of promotions and incentives associated with item 502 may be offered based on the data in social graphs.

In other examples, displays of different items of interest may also be prioritized based on weights assigned according to the quality of the listing for the item (not shown). The quality of the listing may be determined by a number of factors associated with the completeness of the listing, including the number of connections associated with the listing, the number and quality of photos associated with the listing, the number of recommendations, reviews, fans, comments, likes, etc., associated with the listing. In other examples, social graph 500 may be represented using a different graphic, with additional or fewer groups or members of groups.

Figure 6:
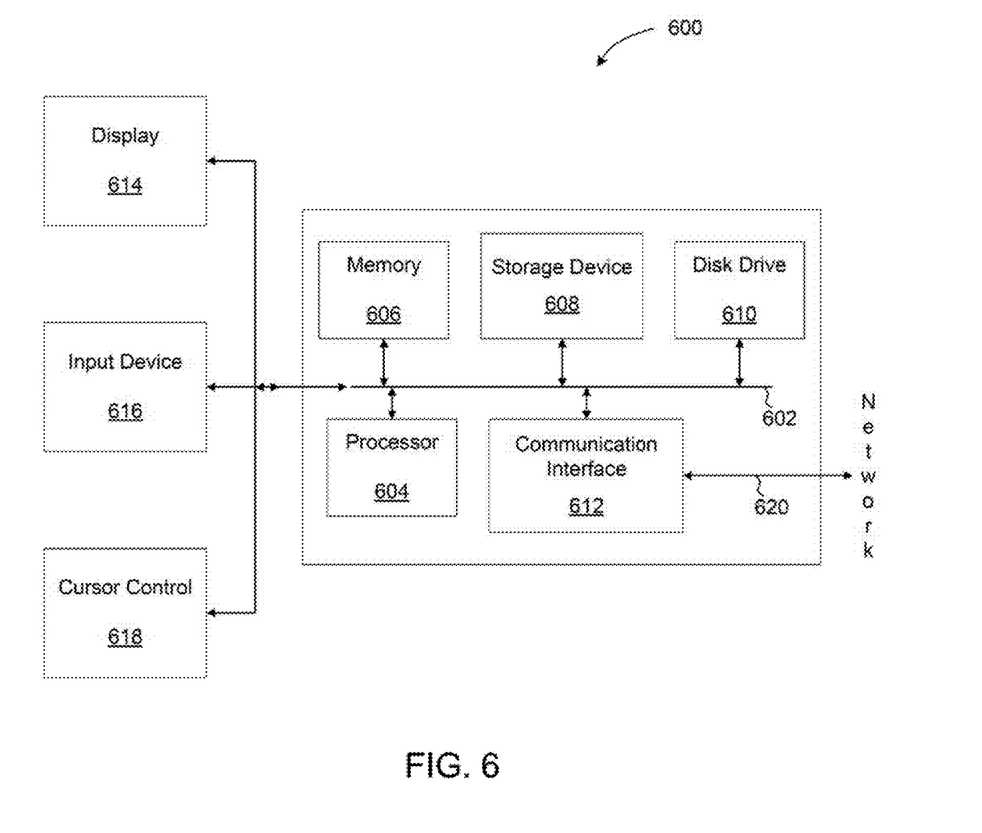
FIG. 6 illustrates an exemplary computer system suitable for creating, storing and using social graphs for marketing items for rent or sale.

FIG. 6 illustrates an exemplary computer system suitable for creating, storing and using social graphs for marketing items for sale or rent. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT, LED, LCD, plasma, OLED, etc.), input device 616 (e.g., keyboard), and cursor control 618 (e.g., mouse or trackball).

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, hard-wired circuitry may be used in place of or in combination with software instructions for implementation.

The term "computer readable medium" refers to any tangible medium that participates in providing instructions to processor 604 for execution. Such a medium may take many forms, including but not limited to, non-volatile media and volatile media. Non-volatile media includes, for example, optical or magnetic disks, such as disk drive 610. Volatile media includes dynamic memory, such as system memory 606.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 602 for transmitting a computer data signal.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A computer-implemented method, comprising: under control of a computing device executing specific computer-executable instructions,
   receiving, by the computing device via a network connection, social network data from a first social network of a plurality of social networks, the social network data identifying a plurality of social network relationships, wherein each social network relationship of the plurality of social relationships indicates a social network relationship between actors;
   receiving, by the computing device via the network connection, rental property data identifying a plurality of property relationships, wherein each property relationship of the plurality of property relationships indicates a relationship between a rental property and an actor, and wherein the rental property data further identifies, for each property relationship of the plurality of property relationships:
   a relationship type; and
   a weighting factor indicative of influence of the actor in the property relationship on acquisitions by other actors with which the actor has a social network relationship, the weighting factor based at least in part on the relationship type;
   receiving, by the computing device via the network connection, a request to identify a target actor that is likely to be influenced to acquire the rental property;
   identifying, by the computing device, from the rental property data, a first actor and a second actor that each have a property relationship with the rental property;
   generating, by the computing device, a social graph for the rental property based at least in part on social network relationships of the first and second actors, wherein the social graph associates the rental property with the first and second actors, identifies the property relationships between the rental property and the first and second actors, and further associates the rental property with other actors that have a social network relationship with at least one of the first actor or the second actor;
   using the social graph for the rental property to identify the target actor, wherein the social graph indicates a relationship between the target actor, the first actor, and the rental property, and wherein the target actor is identified by the computing device based at least in part on the weighting factor indicated by the property relationship between the first actor and the rental property;
   calculating, by the computing device, a promotional discount associated with the rental property based at least in part on the weighting factor indicated by the property relationship of the first actor and the rental property; and
   generating, by the computing device, an offer in association with the rental property, wherein the offer comprises the promotional discount and wherein the offer is associated with the target actor.

2. The computer-implemented method of claim 1, wherein the actors comprise members of the first social network.

3. The computer-implemented method of claim 1, wherein the request is received from a marketing service.

4. The computer-implemented method of claim 1, wherein a relationship type of a first property relationship of the plurality of property relationships comprises an ownership relationship.

5. The computer-implemented method of claim 1, wherein a relationship type of a first property relationship of the plurality of property relationships comprises a friend relationship.

6. The computer-implemented method of claim 1, wherein a relationship type of a first property relationship of the plurality of property relationships comprises a guest relationship.

7. The computer-implemented method of claim 1, wherein the rental property is available to be rented.

8. The computer-implemented method of claim 1, wherein the rental property is a vacation rental property.

9. The computer-implemented method of claim 1, wherein the plurality of influential actors is organized into one or more groups.

10. The computer-implemented method of claim 9, wherein each of the one or more groups is assigned a weight associated with a relationship proximity to the rental property.

11. The computer-implemented method of claim 1, wherein the weighting factor of each property relationship of the plurality of weights property relationships comprises a value that is correlated with a relationship proximity to the rental property.

12. The method of claim 1, wherein a relationship type comprises at least one of a booking, a stay, or a review.

13. A system comprising:
   a non-transitory data store including:
   rental property data identifying property relationships between a rental property and a plurality of actors, wherein for each property relationship between the rental property and an individual actor, the rental property data further identifies a type of the property relationship and a weighting factor indicative of an influence of the actor in the property relationship on rental of the rental property by other actors with which the actor has a social network relationship; and
   social data obtained from a first social network of one or more social networks, the social data indicating, for each actor of the plurality of actors, social network relationships to one or more other actors; and
   a processor configured with executable instructions that, when executed, cause the processor to:
   receive, via a network connection, a request to identify a target actor that is likely to be influenced to rent the rental property;
   identify, from the rental property data, a first actor and a second actor that each have a relationship with the rental property;
   generate a social graph for the rental property based at least in part on social relationships of the first and second actors, wherein the social graph associates the rental property with the first and second actors, identifies the property relationships between the rental property and the first and second actors, and further associates the rental property with other actors that have a social network relationship with at least one of the first actor or second actor;
   use the social graph for the rental property to identify the target actor, wherein the social graph indicates a relationship between the target actor, the first actor, and the rental property, and wherein the target actor is identified based at least in part on the weighting factor indicated by the property relationship between the first actor and the rental property;

calculate, by the processor, a promotional discount associated with the rental property based at least in part on the weighting factor associated with the property relationship between the first actor and the rental property; and transmit, to a computing device associated with the target actor via the network connection, an offer to rent the rental property in accordance with the promotional discount.

\* \* \* \* \*